(12) United States Patent
Saada et al.

(10) Patent No.: US 12,741,401 B2
(45) Date of Patent: Sep. 22, 2026

(54) CHIP MADE FROM RECYCLED COMPOSITE MATERIAL AND PRODUCTION METHOD THEREOF

(71) Applicant: FAIRMAT, Paris (FR)

(72) Inventors: Benjamin Saada, Paris (FR); Romain Planche, Paris (FR); Nicolas Taccoen, Paris (FR)

(73) Assignee: FAIRMAT, Paris (FR)

( * ) Notice: Subject to any disclaimer, the term of this patent is extended or adjusted under 35 U.S.C. 154(b) by 70 days.

(21) Appl. No.: 18/723,364

(22) PCT Filed: Dec. 21, 2022

(86) PCT No.: PCT/EP2022/087374

§ 371 (c)(1),
(2) Date: Jun. 21, 2024

(87) PCT Pub. No.: WO2023/118385

PCT Pub. Date: Jun. 29, 2023

(65) Prior Publication Data

US 2025/0042062 A1 Feb. 6, 2025

(30) Foreign Application Priority Data

Dec. 22, 2021 (FR) ........................................ 2114292
Mar. 31, 2022 (EP) ........................................ 22305430

(51) Int. Cl.
*B29B 17/04* (2006.01)
*B29K 105/10* (2006.01)
*B29K 307/04* (2006.01)

(52) U.S. Cl.
CPC .... *B29B 17/0412* (2013.01); *B29K 2105/105* (2013.01); *B29K 2307/04* (2013.01); *B29K 2995/0097* (2013.01)

(58) Field of Classification Search
None
See application file for complete search history.

(56) References Cited

U.S. PATENT DOCUMENTS

2001/0024722 A1 9/2001 Matsuhisa et al.
2013/0065471 A1* 3/2013 Mortimer ................ B32B 37/00 156/60
2014/0217332 A1* 8/2014 Simmons ................ H01B 1/24 264/105

FOREIGN PATENT DOCUMENTS

EP 2356272 B1 10/2012
EP 2516138 B1 3/2014
EP 2342073 B1 11/2016

OTHER PUBLICATIONS

U.S. Tewari et al.: Solid particle erosion of unidirectional carbon fibre reinforced polyetheretherketone composite; Wear, 252, (2002), p. 992-1000 (Year: 2002).*

(Continued)

*Primary Examiner* — Mohammad M Ameen
(74) *Attorney, Agent, or Firm* — ArentFox Schiff LLP

(57) ABSTRACT

The present invention relates to a chip made from composite material containing carbon fibres in a cured adhesive, said chip having a substantially constant thickness defined between two parallel opposite faces of the chip, the surface of each face comprising carbon fibres that are at least partially not included in the cured adhesive.

8 Claims, 1 Drawing Sheet

(56) References Cited

OTHER PUBLICATIONS

Tewari et al., "Solid particle erosion of unidirectional carbon fibre reinforced polyetheretherketone composites", Wear, XP055959837, CH ISSN: 0043-1648, vol. 252, No. 11-12, pp. 992-1000.

International Search Report received for PCT Patent Application No. PCT/EP2022/087374, mailed on Apr. 13, 2023 (2 pages of English Translation and 3 pages of Original Document).

* cited by examiner

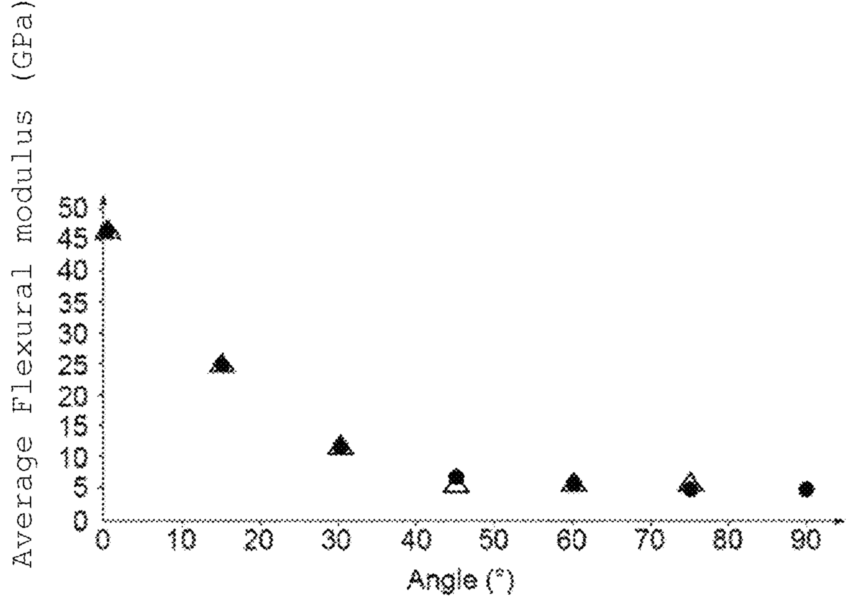
Average Flexural modulus (GPa)
50
45
40
35
30
25
20
15
10
5
0
0
10
20
30
40
50
60
70
80
90
Angle (°)

CHIP MADE FROM RECYCLED COMPOSITE MATERIAL AND PRODUCTION METHOD THEREOF

CROSS-REFERENCE TO RELATED APPLICATIONS

The present application is a national stage application filed under 35 U.S.C. 371 based on International Patent Application No. PCT/EP2022/087374, filed on Dec. 21, 2022, which claims priority to FR Patent Application No. FR2114292, filed on Dec. 22, 2021, and EP patent application Ser. No. 22/305,430.5, filed on Mar. 31, 2022, which are incorporated herein by reference in their entireties.

The present invention relates to the field of recycling composite materials, in particular composite materials including carbon fibres.

The composite materials based on carbon fibres are used in many technical fields for their mechanical properties, in particular of strength and lightness. They are in particular commonly used in the aeronautical field, in the automobile industry, in boating, but also in the field of construction, energy, etc.

The composite materials based on carbon fibres, generally, include carbon fibres included in a matrix.

Several methods can be used to manufacture carbon fibres, the principle being a deposition of carbon at very high temperature, either from paper or viscose ("ex-cellulose" fibres), or from polyacrylonitrile ("ex-PAN" fibres), or from petroleum or coal residues ("ex-pitch" fibre).

The carbon fibres are included in the matrix in a given orientation, for example unidirectionally, or in the form of woven fibre web.

Concerning the matrix, generally, it consists of a polymer or it essentially includes a polymer. The matrix can also be called "adhesive", or even "resin" (the matrix generally being a polymer). In a well-known manner, the matrix can be thermoplastic or thermosetting in nature. Glues which are similar in nature can be used in the same manner within the scope of the present invention.

Thus, unless otherwise provided, the terms "matrix", "glue", "adhesive" and "resin" are considered synonymous in this application.

Thermosetting polymers undergo a chemical reaction called crosslinking when shaping the composite material. This reaction generates chemical bonds and is irreversible. It is generally accepted that the most efficient thermosetting polymers for forming a composite material based on carbon fibres are polyepoxides (known as "epoxy").

Thermoplastic polymers are polymers which, above a certain temperature, called "phase transition temperature", lower than their thermal degradation temperature, become viscous and can thus be shaped. When the temperature drops below this phase transition temperature, the polymer cures and returns to its initial stiffness. This curing is reversible, by heating the polymer again.

The most common thermoplastic polymers are polyethylene (PE), polyethylene terephthalate (PET), or polycaprolactam (PA-6). For some applications, special thermoplastic polymers can be used, such as poly(phenylene ether ether ketone) (PEEK), poly(phenylene sulphide) (PPS), or polyetherimide (PEI).

As the applications of the composite materials based on carbon fibres are numerous and increasingly widespread, the question of recycling these materials arises. In addition to the fact that the amounts of materials that can be recycled are increasing, these composite materials are high-value materials (largely because they contain carbon fibres), the valorisation of which may prove economically relevant.

Recycling may concern elements made from composite material at the end of their life or having suffered damage, elements manufactured but which do not or no longer meet certain standards required for the use for which they are intended (in particular in the aeronautical or space field), or even, more rarely, elements which are not used on a certain date.

In order to recycle composite materials reinforced with carbon fibres, three main categories of methods have been developed: the so-called mechanical recycling, the so-called chemical recycling and the so-called thermal recycling.

The mechanical recycling consists, in principle, in splitting and grinding existing composite material parts to dissociate at least partially the fibres from the resin, so as to obtain fibres of varying length which can be reused as reinforcement in new resin. The slightly fibrous particles resulting from grinding, which are in powder form, can be mixed with a resin during the formation of a new composite material element.

The ground pieces of composite are used as filling elements or as reinforcement in moulded parts, but are not really intended to replace virgin carbon fibres as used in the conventional methods for manufacturing composite elements (based on non-recycled materials).

In this method, the powder obtained by grinding the composite materials to be recycled can be sieved to be sorted into several categories of particle sizes, without however this size having a significant influence on the mechanical properties of the element subsequently formed by including these particles.

Generally, it is estimated that the mechanical properties (flexural strength or bending stiffness) of a part obtained by a state-of-the-art mechanical recycling method are at least divided by four compared to a similar new part. The composite materials based on recycled carbon fibres obtained by mechanical recycling methods therefore generally have a use limited to certain fields in which the mechanical properties, relative to the mass, do not need to be very high. They are thus mainly used in construction (buildings).

The chemical recycling consists in chemically degrading the cured resin of a composite material in order to recover carbon fibres present in this material. The recovered fibres are then generally aligned and/or spun in order to create a yarn from several thousand recovered fibres. The mechanical properties of the parts formed from composite materials including these recycled fibres are much lower than those of composite materials including new, non-recycled carbon fibres.

Several chemical degradation methods are known, in particular conventional solvolysis, solvolysis "under mild conditions", or solvolysis under supercritical conditions. In a conventional solvolysis method, the parts to be recycled are immersed in a solvent, at high temperature (more than 200° C.) and at high pressure (in the range of 180 bar), so that the resin is decomposed. These may, for example, be concentrated acids (in particular nitric acid or sulphuric acid).

In a solvolysis method under mild conditions, more moderate temperatures than in conventional solvolysis, below 200° C., are used. The method takes place at atmospheric pressure (ambient pressure), and milder solvents such as acetone or N,N-dimethylformamide are used, as well as possibly catalysts such as hydrogen peroxide or peroxyacetic acid. A pretreatment with acetic acid may also be used. This being said, solvolysis under mild conditions has a fairly low production efficiency.

In a solvolysis method under supercritical conditions, solvents are used under supercritical conditions to have better diffusivity and an increased solvation capacity. It is a complex and expensive method.

Finally, the thermal recycling consists in principle in thermally degrading the resin of a composite material to recover the carbon fibres therefrom. The heat can be provided by a pyrolysis method, which generally consists in burning the resin in an oven, by a fluidised bed method which uses the combined action of a solvent and a high temperature, and finally by micro-waves.

Although these methods are being optimised, the recovered fibres have significantly degraded mechanical properties compared to new fibres. The recovered fibres are generally short, they must be aligned and spun to be reused in applications requiring correct mechanical characteristics. Otherwise, they are used for filling, as are for example the powders obtained in the mechanical recycling methods mentioned above.

In summary, the different techniques known in the field of recycling composite materials based on carbon fibres consist in:

- grinding the composite material to use the ground material as reinforcement (mechanical recycling);
- or degrading the resin to regenerate carbon fibres (chemical or thermal recycling).

But these two solutions each have significant drawbacks: they offer materials having poor mechanical performance, and/or they are expensive and/or complex to implement. The recycling techniques in which the resin is degraded to recover the carbon fibres further have a significant environmental cost. Indeed, they release the degraded resin in liquid or gaseous form. These releases must be treated.

The present invention aims at proposing recycled elements which can be incorporated into a matrix in order to prepare a composite material part, said recycled elements allowing overcoming the drawbacks mentioned above.

More particularly, the invention relates to a composite material chip including carbon fibres in a cured adhesive, said chip having a substantially constant thickness defined between two parallel opposite faces of the chip, each face including on the surface carbon fibres that are at least partially not included in the cured adhesive.

The term “chip” means a slice of small thickness obtained from a composite material to be recycled including carbon fibres. The chip includes carbon fibres which are at least partially included in a cured adhesive. At least a majority of the fibres of the chip extend substantially parallel to the opposite faces of the chip.

The notion of substantially constant thickness is interpreted as follows. The thickness corresponds to the smallest dimension of the chip, which is small compared to the other dimensions thereof (for example compared to its length and its width for a chip in a rectangular shape). The thickness of the chip is substantially constant, because the chip has two opposite (main) faces which are substantially parallel at all points. Although the chip is flat in the absence of constraints, it can be curved once included in a composite material part such as a panel. This possible curvature is possible due to the small thickness of the chip, which gives it a certain flexibility. The thickness of the chip, measured perpendicular to the main faces of the chip, is constant at all points on the chip, or, at the very least, is perceived as constant by an observer. It is in this sense that it is indicated that the thickness is “substantially” constant, that is to say that it is naturally perceived as constant. Alternatively, it is considered that the thickness is substantially constant when the smallest thickness is not less than half of the largest thickness measured on a chip, and preferably when the difference between the largest thickness and the smallest thickness measured on a chip does not exceed 25%. Alternatively, it is considered that the thickness is substantially constant when the difference between the smallest thickness and the greatest thickness measured on the chip does not exceed 0.5 mm.

Throughout this application, the term “significantly” conventionally refers to the perception of this characteristic according to the system used for its measurement or manufacture. If a characteristic is observed with the naked eye, the term “substantially” therefore refers to an observer's perception of that characteristic. An expression containing the term “substantially” should be interpreted as a technical characteristic produced within the tolerance of the manufacturing method thereof. In particular, the “substantially parallel” character between two elements can be understood to within 10° of angle. If the considered fibre is included in a fabric (typically taffeta, twill or satin), the direction of extension of the fibre is considered by neglecting the undulations of the fibre related to weaving.

The chip according to the invention advantageously has a small thickness (e) compared to the other dimensions thereof. The chip thus being an essentially two-dimensional part, of small thickness, the other dimensions thereof typically correspond to the largest dimension (d) measurable on the surface of the chip and to the dimension measured perpendicularly, also on the surface of the chip. Thus, the term “face of the chip”, mean any of the faces of the chip, namely the lower face or the upper face of the chip. Each of these faces has a surface called surface of the chip.

Advantageously, the ratio (e)/(d) is comprised between 0.05 and 0.0005, preferably between 0.01 and 0.001 and even more preferably between 0.005 and 0.001.

In this application, unless otherwise indicated, the ranges shall be understood inclusive.

Advantageously, the thickness of the chip is comprised between 200 μm and 1 mm, preferably between 200 μm and 500 μm.

The largest dimension (d) of the chip can advantageously be comprised between 1 cm and 1 m, preferably between 5 cm and 50 cm, such as between 5 and 20 cm, more preferably between 7.5 and 15 cm or even more preferably between 8 and 12 cm or alternatively between 10 cm and 20 cm.

By way of example, the length of the chip is in the range of 10 cm. By the term “in the range of X”, it is aimed for a value of X plus or minus 10%.

The chip may have a width comprised between 2 and 20 mm, preferably between 5 and 15 mm, even more preferably between 7 and 10 mm.

By way of example, the width of the chip is in the range of 9 mm.

The term “cured adhesive” means an adhesive which has undergone a chemical reaction called crosslinking or polymerisation. This chemical reaction occurs before the formation of the chips, this is referred to as cured adhesive during curing prior to the formation of the chip.

The cured adhesive of the chip may advantageously be a thermosetting resin such as epoxy resins, cyanate ester and phenolic resins. The appropriate epoxy resins comprise bisphenol A diglycidyl ethers, bisphenol F diglycidyl ethers, novolac epoxy resins and N-glycidyl ethers, glycidyl esters, aliphatic and cycloaliphatic glycidyl ethers, aminophenol glycidyl ethers, glycidyl ethers of any substituted phenols and mixtures thereof.

Modified blends of the aforementioned thermosetting polymers are also included.

By "modified blend", reference is made to a polymer which is modified, typically, by the addition of rubber or thermoplastic.

The cured adhesive of the chip can also be a thermoplastic resin. Among thermoplastics, it is possible to distinguish high-performance plastics, engineering plastics and standard plastics. Most thermoplastics used in the composite materials are high-performance plastics or engineering plastics. These plastics are distinguished in particular from standard plastics by greater wear resistance and chemical resistance.

The thermoplastics, depending on their nature, can be hard in amorphous form or in crystalline form.

Among the amorphous thermoplastics which are commonly used in the composite materials, there are polyetherimides (PEI), polyethersulphone (PES), and polysulphones (PSU).

Among the crystalline thermoplastics which are commonly used in the composite materials, there are polyamides (PA), poly(ethylene terephthalate), polyphthalamide (PPA), poly(phenylene sulphide) (PPS), and polyetheretherketone (PEEK).

A carbon fibre is considered as included in the cured adhesive if the entire surface thereof is in contact with this adhesive, that is to say if the entire surface of the fibre is coated with the adhesive. Throughout the application, the terms "included in" and "coated with" are considered equivalent.

In the chip according to the invention, the portion of the carbon fibre which is not included in the cured adhesive constitutes a bare fibre.

The presence of bare fibres on the surface of the chip results from the chip cutting method according to the invention.

Preferably, the chip according to the invention has a bare fibre area ratio which is greater than or equal to 22%, the percentage being relative to the total surface area of the face of the chip which is analysed.

The bare fibre area ratio represents the surface area occupied by the carbon fibres which are not included in the cured adhesive relative to the total surface area of the face of the chip which is analysed.

The chip may have a bare fibre area ratio which is greater than or equal to 22%, preferably comprised between 24% and 60%, such as a bare fibre area ratio comprised between 26 and 50%.

The bare fibre area ratio is determined on a sample including carbon fibres or on a chip according to the invention, according to the measurement method including the following steps:

a) Horizontal arrangement of the sample or the chip on the stage of a digital microscope, so as to obtain images where the orientation of the fibres is vertical, the microscope being oriented at an angle of 20 to 40°, preferably 30° relative to the straight line normal to the plane of the sample or the chip and a partial annular LED type light is applied such that the light beam reaches the surface of the fibres in a direction orthogonal to the axis of orientation of the fibres
b) Selection of the pixels having a grey level threshold value which is greater than or equal to 50
c) Count of the selected pixels and obtaining the percentage of surface area occupied by the selected pixels relative to the total surface area of the image, this percentage corresponding to the value of the bare fibre area ratio.

An annular light is a light forming a circle around the microscope objective.

The plane of the sample or the chip is materialised by one face of the sample or the chip.

The light circle can be divided into four quarters. This is referred to as "partial annular light" when only one of the quarters is used to illuminate the sample, thus defining a left, right, high or low annular light, depending on the location of the quarter relative to the microscope objective.

An annular light is distinguished from a coaxial light which illuminates the sample from the centre of the microscope objective.

The partial annular light applied in step a) may be a right, left, high or low partial light. Preferably the partial annular light applied in step a) is a left or right partial annular light, even more preferably, the partial annular light is right partial annular light.

In the case of a right partial annular light, the microscope is then oriented at an angle of 20 to 40°, preferably 30° to the right relative to the straight line normal to the plane of the chip.

Preferably, the bare fibre area ratio is determined according to the method set out in Example 2, point 1.

Preferably, in the chip according to the invention, one face has a roughness measured by a mass loss which is greater than or equal to 0.008%, said mass loss being measured by an abrasion test performed on a linear abrasion meter using an H18 abrasive rubber for 100 cycles.

The term "roughness" of a chip means the condition of the face of the chip which has asperities. Preferably, each face of the chip has roughness.

This roughness is determined according to the measurement method comprising the following steps:

a) Initial weighing of the chip to determine the initial mass thereof,
b) Fixing the chip on the support of a linear abrasion meter,
c) Application of an H18 abrasive rubber for 100 abrasion cycles, with a cycle length of 10 cm and a cycle speed of 25 cycles/min,
d) Final weighing of the chip to determine the final mass thereof,
e) Determination of the roughness by calculating the difference between the initial mass of the chip (obtained in step a)) and the final mass of the chip (obtained in step d)).

Preferably, the roughness is measured according to the method described in Example 2.2.

Preferably, the chip has a roughness measured by a mass loss comprised between 0.014% and 0.20%, and more preferably, the mass loss is comprised between 0.014% and 0.15%.

Advantageously, the chip according to the invention has a bare fibre area ratio which is greater than or equal to 22% and a roughness measured by a mass loss which is greater than or equal to 0.008%. Preferably, the chip has a bare fibre area ratio comprised between 24% and 60% and a mass loss comprised between 0.014% and 0.20%. Even more preferably, the chip can have a bare fibre area ratio comprised between 26% and 50%, and a mass loss comprised between 0.014% and 0.15%.

Advantageously, in the chip according to the invention, said carbon fibres extend substantially parallel to said opposite faces of the chip.

More particularly, the carbon fibres included in the cured adhesive extend substantially parallel to said opposite faces of the chip.

The carbon fibres not included in the cured adhesive can extend substantially parallel to said opposite faces of the chip.

Advantageously, in the chip according to the invention, the carbon fibres are oriented in the same direction.

Carbon fibres oriented in the same direction are also called unidirectional.

More particularly, the carbon fibres included in the cured adhesive are oriented in the same direction.

Carbon fibres which are not included in the cured adhesive can be oriented in the same direction.

Advantageously, the chip has a rectangular shape.

Preferably, each face of the chip according to the invention has a surface area of at least 1 $cm^2$.

Each face has a surface area called surface area of the chip.

The surface area of the chip can be at least 3 $cm^2$, 5 $cm^2$, 10 $cm^2$ or 20 $cm^2$, 100 $cm^2$.

The surface area of the chip can therefore be comprised between 1 and 100 $cm^2$, between 2 and 25 $cm^2$ or between 5 and 15 $cm^2$.

The invention also relates to a method for manufacturing a chip according to the invention, said method comprising the following steps:

- providing a composite material including carbon fibres which are oriented in a substantially parallel manner in a cured adhesive;
- mechanically cutting the composite material with a blade device, said cutting being carried out by positioning the carbon fibres parallel to the advancing direction of the blade of said blade device.

By way of example, the blade device can be a planer type system. A planer type system corresponds to a cutting machine including a blade allowing thin slices of regular thickness to be separated from the surface of an element over which it has passed.

The method for manufacturing the chip is more particularly described in Example 1.

The invention also relates to the use of chips as defined above in a composite material part.

The chips according to the invention have the advantage of having an improved adhesion with the matrix.

In particular, the inventors have discovered that the chips having a bare fibre area ratio which is greater than or equal to 22% and/or a roughness measured by a mass loss which is greater than or equal to 0.008% as defined above; have an adhesion with the improved matrix. Improving the adhesion between the matrix and the carbon fibres leads to a better cohesion of the chip, thus limiting the degradation of the chip and consequently also limiting the degradation of a composite material part comprising the chips according to the invention.

Other characteristics and advantages of the invention will appear in the FIGURE and the following examples and which are given for illustrative purposes.

FIG. 1 represents, in the form of a graph, the flexural modulus of a panel comprising chips according to the invention which are organised in a unidirectional manner, the chips being obtained from composite material to be recycled, and that of a new panel containing unidirectionally oriented carbon fibres.

EXAMPLE 1: OBTAINING A CHIP ACCORDING TO THE INVENTION

The formation of chips is carried out from elements made from composite material based on carbon fibres which are to be recycled.

To do this, the chips are obtained by mechanically cutting said elements.

The chip cutting can be made using a cutting machine such as a blade device. The blade device may be a planer type system. A planer type system corresponds to a cutting machine including a blade allowing thin slices of regular thickness to be separated from the surface of an element over which it has passed.

When an element is cut to form chips, the blade of the blade device is positioned, in a conventional manner, such that the edge of the blade moves in a plane parallel to the direction of advancement of the blade of said blade device, the direction of advancement of the blade of the blade device being rectilinear.

The "edge of the blade" also called "sharp edge" corresponds to the edge of the blade which first penetrates the material to be cut.

The material to be cut is positioned in the cutting machine according to the organisation of the carbon fibres it contains.

If the fibres in the material to be cut are unidirectional, that is to say included in a matrix substantially parallel, in only one direction, then the fibres are positioned parallel to the direction of advancement of the blade of said blade device.

If the fibres are included in the form of woven web, the part will preferably be placed such that the weft or warp threads are substantially parallel to the direction of advancement of the blade of said blade device.

The fibres can also be disposed in a succession of layers, each layer including unidirectional fibres, but the layers having different fibre orientations. This is for example the case for materials called "four-directional" materials, the layers of which can have the following successive relative orientations: 0° (reference layer), 90°, 45°, −45°. Thus, a "four-directional" material is a laminated material comprising several layers of unidirectional carbon fibre, the layers being oriented in four different directions: 0°, 90°, 45°, −45°.

The blade device can advantageously be adjusted so that the blade thereof attacks the element between two layers of fibres, whether they are two layers of unidirectional fibres or two woven webs.

The cutting plane will advantageously be maintained between the layers of fibres in order to maintain their integrity as much as possible.

Advantageously, the blade device can comprise a micrometric wedge system consisting of a superposition of elements disposed on either side of the material to be cut, said wedge system being positioned on a reference plane and having an accuracy of less than the $1/10^{th}$ of a millimetre. Such a wedge system allows controlling the attack area of the blade and thus make a more accurate cut between the layers of fibres. This system thus allows controlling the thickness of the chips obtained while keeping the carbon fibres intact.

Thin slices of composite material are thus obtained. These slices may in particular have a thickness comprised between 200 μm and 1 mm, preferably between 200 μm and 500 μm.

The elements to be cut are brought to the desired length for the chips before being cut into slices by the cutting machine, such that the chips having the desired length are directly obtained at the outlet of the cutting machine.

Alternatively, the slices are then recut to obtain chips. Typically, they are cut transversely by any suitable cutting means, for example by sawing, in order to form fine rectangular chips of regular length. Other shapes of chips can of course be cut from the obtained slices.

For example, for the production of flat panels, chips of 10 cm to 20 cm in length were obtained and allowed obtaining very good results in terms of mechanical performance as exemplified below. Greater lengths can also be used, such as in the range of 50 cm or even 1 m.

Obviously, the cutting method described above can be adapted according to the considered application and the amounts to be produced.

Once the chips are formed, they therefore take the form of fine elements including carbon fibres which are, at least partially, included in a cured resin. The chips are therefore in the form of substantially two-dimensional parts (in that their thickness is very small compared to the other dimensions thereof). The surface of the chips is advantageously of at least 1 $cm^2$, and preferably greater than 3 $cm^2$, in the range of 10 $cm^2$, or even greater, for example up to approximately 100 $cm^2$.

The carbon fibres are oriented in the cured resin of the chips. Preferably, they are substantially parallel, orthogonal to each other, and/or oriented at 45° from each other.

The fibres of the chips having a substantially constant thickness, they include two opposite faces (between which the thickness is defined). The cutting of the chips is carried out so as to keep the carbon fibres intact as much as possible. To do this, the chips are cut such that the fibres (the majority, or even almost all or all of them) extend parallel to the opposite faces of the chips. The fibres thus extend in planes which are parallel to the general plane of extension of the chip, and can have a great length despite the small thickness of the chips.

The term “majority”, means more than 50% in number.

The term “almost all”, means more than 90% in number.

EXAMPLE 2: CHARACTERISATION OF THE CHIPS ACCORDING TO THE INVENTION

The applicant has carried out tests allowing characterising the chips according to the present invention. These tests were carried out using the materials listed in table 1.

These materials are in the form of composite rod, plate or web.

A composite rod is a cylinder obtained by pultrusion of a composite material.

A composite web is distinguished from a composite plate by its thickness. Indeed, the web has a thickness in the range of 0.2 mm while the composite plate has a thickness of several millimetres.

The partially consolidated composite webs are webs whose carbon fibres are integrated into a matrix or resin whose polymerisation has started, but is not completed. They are therefore distinguished from composite webs including carbon fibres in a non-polymerised matrix because for the latter the polymerisation has not started.

When no details are provided on the state of polymerisation of the matrix of the materials presented in table 1 above, this means that the matrix is polymerised.

TABLE 1

List of the used materials

| No | Composition of the composite material | Technique for obtaining the chips |
|---|---|---|
| 1 | Composite rod including carbon fibres in an epoxy matrix, with a UD* arrangement | Cutting according to Example 1 with a blade device |
| 2 | Composite rod including carbon fibres in an epoxy matrix, with a UD* arrangement | Cutting according to Example 1 with a blade device then sanding the surface with P1000 grit sandpaper |
| 3 | Composite plate including carbon fibres in an epoxy matrix, with a UD* arrangement | Cutting according to Example 1 with a blade device |
| 4 | Composite plate including carbon fibres in an epoxy matrix, with a UD* arrangement | No cutting, smooth chips |
| 5 | Composite plate including carbon fibres in an epoxy matrix, with a UD* arrangement | No cutting, sanding with P80 grit |
| 6 | 0.15 mm thick composite web including carbon fibres in an epoxy matrix, with a UD* arrangement | No cutting |
| 7 | Composite web including carbon fibres in an unpolymerised epoxy matrix, with a UD* arrangement | No cutting |
| 8 | Composite web including carbon fibres in an unpolymerised epoxy matrix, with a UD* arrangement | No cutting, sanding with P80 grit |
| 9 | Partially consolidated composite web including carbon fibres in an epoxy matrix, with a UD* arrangement | No cutting, smooth chips |
| 10 | Partially consolidated composite web including carbon fibres in an epoxy matrix, with a UD* arrangement | No cutting, sanding with P80 grit |
| 11 | Composite web including carbon fibres in a thermoplastic polyphenylene sulphide (PPS) resin, with a UD* arrangement | No cutting |
| 12 | Composite sheet including carbon fibres in a thermoplastic matrix, with a UD* arrangement | No cutting |

*UD: unidirectional arrangement of the carbon fibres

The materials 1 to 12 have all been sized to have the same width: 9 mm and the same length: 100 mm. To do this, the materials 1 and 2 were sized using a mitre saw, the material 3 was sized using a paper trimmer and materials 4 to 12 were sized either via a paper trimmer or using scissors.

Then, the materials 1 to 3 were cut in order to obtain chips according to the invention. The chips according to the invention are obtained by the method as described in Example 1.

The mechanical cutting with a plane is carried out such that it favours the cuts along the axis of the fibres. Indeed, the materials 1-3 consisting of mainly unidirectional fibres, that is to say fibres oriented in a single direction, these are positioned parallel to the direction of advancement of the blade of the mechanical blade cutting device.

Cutting as described above allows obtaining chips of regular thickness, to keep the carbon fibres intact as much as possible and obtaining chips comprising longer fibres.

The chips obtained from the materials 1 to 4 have a thickness comprised between 0.3 and 0.5 mm.

The materials 4 to 12 are used as comparative examples and have not been cut.

1. Surface Analysis: Determination of the Bare Fibre Area Ratio

Surface analyses were performed on all chips obtained from the materials 1 to 12 according to the procedure detailed below.

The bare fibre area ratio is defined as the surface occupied by bare carbon fibres, that is to say by carbon fibres which are not included in or not coated with resin, relative to the total surface which is analysed.

The bare fibre area ratio was determined for each of the materials 1 to 12 using a VHX-970F digital microscope marketed by the Keyence brand. The latter is provided with a VH-Z20T zoom objective capable of providing magnifications of ×20 to ×200. The image processing was carried out with ImageJ software, version 2.1.0/1.53c.

The principle of the measurement is to carry out an image processing with the microscope by selecting the brightest areas, theoretically corresponding to the carbon fibres, and extracting them to measure the surface area they occupy. The protocol is as follows:

a) Sample Arrangement

The sample or chip is placed horizontally on the microscope stage such that the orientation of the fibres on the images taken is vertical. The microscope is oriented at an angle of 30° relative to the straight line normal to the plane of the sample or chip (preferably to the right) and a LED type partial annular light (preferably a right partial annular light relative to the microscope objective) is applied such that the light beam reaches the surface of the fibres in a direction orthogonal to the axis of the fibres. This configuration allows, on the one hand, avoiding taking into account fibres which are coated in transparent resins and, on the other hand, preventing the reflection of the resin areas.

b) Pixel Selection

A selection of the pixels is made by the software by performing the following steps in the "Image">"Adjust">"Color Threshold" tab. This option allows selecting the brightness from which the pixels will be selected. For all tested materials the grey level was set to 50 ("Brightness" parameter). All areas whose grey level is greater than or equal to 50 have thus been selected.

c) Results

Once the pixels have been selected, they are counted by going to the "Analyze">"Analyze Particles" tab. The size of the pixels is set from 0 and their circularity is set between 0 and 1. The software then gives as a result the percentage of occupied surface area by the selected pixels relative to the total surface area of the image, which corresponds to the value of the bare fibre area ratio.

For each material, three chips are analysed and ten measurements are performed per chip. The bare fibre area ratio per chip is obtained by averaging these 10 measurements. The bare fibre area ratio per material is obtained by averaging the rates obtained by each of the three chips. The results are presented in Table 2 below.

TABLE 2

Bare fibre area ratio of the materials 1 to 12

| No | Average (%) | standard deviation | CV (%) | Interval (%) | |
|---|---|---|---|---|---|
| 1 | 33.27 | 1.17 | 3.50% | 32.10 | 34.43 |
| 2 | 30.34 | 4.06 | 13.38% | 26.28 | 34.40 |
| 3 | 40.68 | 2.44 | 6.01% | 38.23 | 43.12 |
| 4 | 11.90 | 2.01 | 16.87% | 9.89 | 13.91 |
| 5 | 13.66 | 2.23 | 16.35% | 11.43 | 15.90 |
| 6 | 10.47 | 2.87 | 27.39% | 7.60 | 13.34 |
| 7 | 2.31 | 0.75 | 32.30% | 1.56 | 3.06 |
| 8 | 11.00 | 1.25 | 11.32% | 9.76 | 12.25 |
| 9 | 4.77 | 2.11 | 44.31% | 2.66 | 6.88 |
| 10 | 3.41 | 0.36 | 10.70% | 3.04 | 3.77 |
| 11 | 15.70 | 5.50 | 35.05% | 10.20 | 21.21 |
| 12 | 0.72 | 0.07 | 9.16% | 0.66 | 0.79 |

The chips obtained from the materials 1 to 3 (according to the invention) all have a bare fibre area ratio greater than or equal to 22% (taking into account the standard deviation) which is not the case for comparative chips of the materials 4 to 12.

This technical characteristic defining the chips according to the invention allows obtaining a composite material having high mechanical properties, as demonstrated below.

2. Abrasion Test

An abrasion test was performed in order to determine the mass loss of the chips, with a view to characterising their roughness.

This test was performed using a Taber® linear abrasion meter (5750) provided with an H18 abrasion rubber. This test is carried out according to the procedure detailed below:

The sample is fixed on a support then subjected to the action of the H18 abrasive rubber (characteristic of a non-resilient material) mounted on the linear abrasion meter.

The following parameters are used:

No load applied in addition to the support;

Number of abrasion cycles: 100;

Cycle length: 10 cm;

Cycle speed: 25 cycles/minute.

The samples are weighed initially, then after 50 cycles, and finally after 100 cycles, to determine the total mass loss. For each material, at least three samples were tested and the average of the obtained values was calculated.

The mass loss provides information on the surface condition of the chips. Indeed, the action of the abrasion rubber on a smooth surface will result in a lower mass loss compared to its action on a rough surface comprising asperities. This is explained by the fact that the action of the abrasion rubber will lead to the elimination of these surface asperities.

Thus, the greater the mass loss, the rougher the surface and therefore contains asperities.

The results presented in Table 3 are expressed in grams, and as a percentage of mass lost relative to the initial mass.

TABLE 3

| Abrasion test results | | | | | |
|---|---|---|---|---|---|
| No | Loss (%) | standard deviation | CV (%) | Interval (%) | |
| 1 | 0.065 | 0.0361 | 55.87% | 0.10 | 0.029 |
| 2 | 0.026 | 0.0071 | 27.50% | 0.033 | 0.019 |
| 3 | 0.019 | 0.00473 | 25.02% | 0.024 | 0.014 |
| 4 | 0.015 | 0.01246 | 81.18% | 0.028 | 0.003 |
| 5 | 0.068 | 0.08410 | 124.41% | 0.152 | −0.016 |
| 6 | 0.005 | 0.00067 | 14.83% | 0.005 | 0.004 |
| 7 | 0.024 | 0.02271 | 94.96% | 0.047 | 0.001 |
| 8 | 0.063 | 0.01174 | 18.69% | 0.075 | 0.051 |
| 9 | 0.012 | 0.00478 | 40.86% | 0.016 | 0.007 |
| 10 | 0.017 | 0.01267 | 72.83% | 0.030 | 0.005 |
| 11 | 0.002 | 0.00191 | 79.62% | 0.004 | 0.0488% |
| 12 | 0.001 | 0.000593 | 66.70% | 0.001 | 0.0296% |

It follows from Table 3 that the chips obtained from the materials 1 to 3 have a roughness measured by a mass loss which is greater than or equal to 0.008% by taking into account the standard deviation.

These technical characteristics defining the chips according to the invention allow obtaining a composite material having high mechanical properties as demonstrated below.

EXAMPLE 3: MECHANICAL PROPERTIES OF A COMPOSITE MATERIAL PART

The Applicant has carried out characterisation tests, in terms of mechanical characteristics, of the materials obtained from chips according to the present invention.

The tests whose results are described below, were carried out on prototype plates measuring 23 cm by 23 cm and having a thickness comprised between 3.5 mm and 3.6 mm.

The chips used in the tests presented here are from composite material elements including carbon fibres in a unidirectional arrangement included in an epoxy resin type adhesive. The used elements are from the aeronautical industry. The composite material had characteristics which are identical or similar to the "UD carbon plate" material, the characteristics of which are indicated in Table 4 below.

The chips are cut according to Example 1 from a starting composite material including carbon fibres in a unidirectional arrangement included in an epoxy resin type adhesive.

The obtained chips are rectangular, and have a length l of 100 mm, a width b of 9 mm and a thickness comprised between 0.3 mm and 0.5 mm.

From these chips, the plates are made according to the method as described below:

- coating the chips: the chips are mixed with a liquid adhesive in order to coat them, with a view to moulding them;
- moulding the chips in the form of flat panels;
- pressing the mould;
- unmoulding the part; and
- curing the part.

The mould is coated with a mould release agent and is topped so as to create a layer of adhesive on the surface of the mould.

The used adhesive is the ADEKIT H9011 system used according to the manufacturer's recommendations.

The chips are manually positioned in the mould.

The ratio of chips to adhesive is, unless otherwise stated, 65/35 by mass in the finished plate.

The moulding is carried out under a press, by applying a force of 20 ton-force, and by controlling the temperature to approximately 70° C.

After unmoulding, the plates are kept for a week at ambient temperature (20° C.) to finalise the curing before being used for measurements.

The plates thus obtained correspond to plates of composite material whose chips, and therefore the fibres, are positioned in a unidirectional arrangement.

Table 4 below compares the mechanical characteristics of the plates UD1 and UD2 s to reference plates (UD carbon plate, wooden plate, aluminium plate).

TABLE 4

| Mechanical properties | | | | | | | |
|---|---|---|---|---|---|---|---|
| | | Longitudinal direction performance (0°) | | Transverse direction performance (90°) | | Performance 45° | |
| Material | Density (g/cm$^3$) | Flexural modulus (en GPa) | Tensile strength (en MPa) | Flexural modulus (en GPa) | Tensile strength (en MPa) | Flexural modulus (en GPa) | Tensile strength (en MPa) |
| Aluminium (5754 H22) | 2.7 | 70 | 300 | 70 | 300 | 70 | 300 |
| Wood (Beech) | 0.8 | 14 | 110 | 10 | 100 | 12 | 100 |
| UD carbon plate | 1.45 | 150 | 1500 | 5 | 40 | 10 | 100 |
| Plate UD1 (50% wt. of chips) | 1.3 | 57 | 616 | — | — | — | — |
| Plate UD2 (65% wt. of chips) | 1.3 | 85 | 750 | 4 | 40 | 10 | 100 |

The "UD carbon plate" corresponds to a plate made from a composite material based on new unidirectional carbon fibres.

The "Plate UD1" and "Plate UD2" correspond to composite material plates in accordance with embodiments of the invention, obtained as described above, and whose chips, and therefore the fibres, are positioned according to a unidirectional arrangement.

It is notable that the flexural modulus and the tensile strength of the Plate UD2 (with 650 of chips by mass) is significantly greater than 500 of the values obtained for the reference UD Carbon Plate, i.e. a composite material based on comparable new unidirectional fibres (from which the used chips can be extracted). In particular, the flexural modulus obtained, in the longitudinal direction, is equal to 57% of the flexural modulus of the comparable new unidirectional material based on carbon fibres. By bringing these results to equal masses of the panels (taking into account the differences observed in terms of density), the flexural modulus of the Plate UD2 (with 65% of chips by mass) is equal to 63% of the flexural modulus of the reference UD Carbon Plate.

The results presented above demonstrate the production of recycled materials with high mechanical performance. These results are obtained for materials including a proportion of chips which can be further increased relative to the added amount of adhesive (ratio of 65/35 by mass at most in the represented examples). However, the Applicant has observed that the percentage of chips directly influences the obtained mechanical performance, because it induces the percentage of fibres within the material. In particular, the flexural modulus of the Plate UD2 (containing 65% of chips by mass) is almost 50% higher than that of the Plate UD1 (containing 50% of chips by mass). The tensile strength is increased by more than 20%.

The chips according to the invention therefore allow obtaining a recycled material which has approximately 70% of the mechanical performances, in particular 70% of the flexural modulus, and (up to 75% to 80% of the performance at identical masses) of the comparable materials based on new fibres, with a simple manufacturing method, and having a low environmental impact compared to the chemical or thermal recycling methods.

Furthermore, even higher performances can be achieved, the Applicant having successfully produced parts containing more than 65% by mass of chips (in this case up to 78% by mass, and a panel containing approximately 85% by mass of chip seems feasible).

EXAMPLE 3: MECHANICAL PROPERTIES OF A COMPOSITE MATERIAL PART

FIG. 1 represents the flexural modulus of a panel made from chips according to the invention (obtained from a composite material to be recycled), the chips being organised in a unidirectional manner, and that of a panel obtained from new composite material containing unidirectionally oriented carbon fibres.

The flexural modulus is plotted on the ordinate.

The abscissa shows the angle at which the measurement is carried out. An angle of 0° corresponds to the direction of extension of the fibres or the chips, and 90° corresponds to the direction transverse to the fibres and/or chips.

The triangles correspond to the measurements made on a plate of a material comprising chips according to the invention including unidirectional carbon fibres, said chips being organised in a unidirectional manner. The flexural modulus of this plate, measured in the direction of extension of the chips and the fibres they contain, is 47 GPa.

The circles represent the theoretical bending moduli calculated for an equivalent plate, formed from a new composite material based on unidirectional carbon fibres whose flexural modulus in the direction of the fibres it contains would be 47 GPa.

It appears that, surprisingly, the measurements carried out for a composite material comprising chips according to the invention correspond perfectly to the theoretical values obtained for the new material formed with equivalent continuous fibres.

Thus, the mechanical properties of an element formed with the chips according to the invention are predictable according to the knowledge generally applied to new composite materials based on equivalent continuous carbon fibres.

The invention claimed is:

1. A composite material chip comprising carbon fibers in a cured adhesive, said chip having a substantially constant thickness defined between two parallel opposite faces of the chip, each face including on the surface carbon fibers that are at least partially not included in the cured adhesive, wherein a portion of the carbon fiber which is at least partially not included in the cured adhesive constitutes a bare fiber, said chip having a bare fiber area ratio which is greater than or equal to 22%, the percentage being related to the total surface area of the face of the chip which is analyzed.

2. The chip according to claim 1, one face of which has a roughness measured by a mass loss which is greater than or equal to 0.008%, said mass loss being measured by an abrasion test performed on a linear abrasion meter using an H18 abrasive rubber for 100 cycles.

3. The chip according to claim 1, having a thickness between 200 μm and 1 mm.

4. The chip according to claim 1, wherein said carbon fibers extend substantially parallel to said opposite faces of the chip.

5. The chip according to claim 1, wherein the carbon fibers are oriented in the same direction.

6. The chip according to claim 1, having a rectangular shape.

7. The chip according to claim 1, wherein each face of the chip has a surface area of at least 1 $cm^2$.

8. A method for manufacturing a chip as defined according to claim 1, said method comprising the following steps:

- providing a composite material comprising carbon fibers which are oriented in a substantially parallel manner in a cured adhesive; and
- mechanically cutting the composite material with a blade device, said cutting being carried out by positioning the carbon fibers parallel to the direction of advancement of the blade of said blade device.

* * * * *